United States Patent
Uberti

(10) Patent No.: US 11,675,425 B2
(45) Date of Patent: Jun. 13, 2023

(54) SYSTEM AND METHOD OF HEAD MOUNTED DISPLAY PERSONALISATION

(71) Applicant: Sony Interactive Entertainment Inc., Tokyo (JP)

(72) Inventor: David Erwan Damien Uberti, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/724,797

(22) Filed: Apr. 20, 2022

(65) Prior Publication Data
US 2022/0350399 A1    Nov. 3, 2022

(30) Foreign Application Priority Data

Apr. 28, 2021  (GB) .................................. 2106076

(51) Int. Cl.
*G06F 3/01*   (2006.01)
*A63F 13/213*   (2014.01)
(Continued)

(52) U.S. Cl.
CPC ............ *G06F 3/012* (2013.01); *A63F 13/213* (2014.09); *A63F 13/22* (2014.09); *A63F 13/26* (2014.09);
(Continued)

(58) Field of Classification Search
CPC ........ A63F 13/22; A63F 13/26; A63F 13/213; A63F 2300/8082; G06V 40/10;
(Continued)

(56) References Cited

U.S. PATENT DOCUMENTS 10,482,566 B2 *  11/2019  Poornachandran .... G06N 20/20
10,573,042 B2 *   2/2020  Kaehler ............... G06V 40/193
(Continued)

FOREIGN PATENT DOCUMENTS

CN          109643161 A  *  4/2019  ............. A63F 13/25
WO    WO-2021055241 A1 *  3/2021  ........... A63F 13/332

OTHER PUBLICATIONS

Combined Search and Examination Report for corresponding GB Application No. GB2106076.9, 9 pages, dated Jan. 21, 2022.
(Continued)

*Primary Examiner* — Vinh T Lam
(74) *Attorney, Agent, or Firm* — Matthew B. Dernier, Esq.

(57) ABSTRACT

A personalisation system configured to perform head mounted display personalisation comprises a head mounted display 'HMD' includes: at least a first video camera, a simultaneous localization and mapping processor configured to detect feature points of a real world environment captured by the at least first video camera when the HMD is worn by a user, a user identification processor configured to identify the user responsive to at least a subset of the detected feature points of the real world environment, a personalisation processor configured to personalise at least a first aspect of presenting graphical content to the user with the HMD in response to identification of the user, and a storage processor operable to store, in a memory, personalisation information in association with the identification of the user for subsequent use.

15 Claims, 3 Drawing Sheets

(51) Int. Cl.
*A63F 13/22* (2014.01)
*A63F 13/26* (2014.01)
*G06T 7/73* (2017.01)

(52) U.S. Cl.
CPC ........ *G06T 7/73* (2017.01); *A63F 2300/8082* (2013.01); *G06T 2207/10016* (2013.01); *G06T 2207/30244* (2013.01)

(58) Field of Classification Search
CPC ........... G06V 20/20; G06F 3/012; G06T 7/73; G06T 2207/30244; G06T 2207/10016
See application file for complete search history.

(56) References Cited

U.S. PATENT DOCUMENTS

| | | | |
|---|---|---|---|
| 10,632,385 B1* | 4/2020 | Harvey | A63F 13/213 |
| 10,636,217 B2 | 4/2020 | Osman | |
| 10,639,557 B2* | 5/2020 | Hake | G06F 3/012 |
| 10,853,647 B2* | 12/2020 | Smith | G06V 20/20 |
| 10,937,191 B2* | 3/2021 | Iyer | G01C 21/1652 |
| 11,012,616 B2* | 5/2021 | Wei | H04N 23/80 |
| 11,042,729 B2* | 6/2021 | Sud | G06V 10/454 |
| 11,100,692 B2* | 8/2021 | Kaehler | G06V 40/171 |
| 11,290,706 B2* | 3/2022 | Edwin | H04N 13/344 |
| 2019/0325633 A1 | 10/2019 | Miller, IV | |
| 2019/0384405 A1 | 12/2019 | Iyer | |
| 2020/0019781 A1* | 1/2020 | Smith | G06T 7/70 |
| 2020/0126252 A1* | 4/2020 | Iyer | G01C 21/1652 |
| 2022/0343534 A1* | 10/2022 | Aleem | G06V 10/255 |

OTHER PUBLICATIONS

Extended European Search Report for corresponding EP Application No. 22168839.3, 8 pages, dated Aug. 5, 2022.

* cited by examiner

SYSTEM AND METHOD OF HEAD MOUNTED DISPLAY PERSONALISATION

BACKGROUND OF THE INVENTION

Field of the Invention

The present invention relates to a system and method of head mounted display personalisation.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventional head mounted displays or 'HMDs' typically comprise virtual reality headsets (where the user's vision is substantially or completely occluded by the headset, and a virtual environment proved instead) or augmented reality headsets, which comprise a see-through aspect provided either by a transparent lens on to which graphics are typically projected, or by relaying video images of the real world to a display presented to the user.

In either case, it is generally desirable to personalise the HMD to the user to enhance their experience of using the device. This may include for example adjusting one or more properties or parameters of the HMD according to the interpupilary distance of the user (which can affect 3D perception).

Personalisation can be achieved for example by associating settings for the HMD with a user account, and then implementing the settings when the user logs in to that account. However, commonly users share an HMD without switching accounts (for example within a single gameplay session) because the using an HMD is an inherently solo activity and so to share the experience within a game it is also necessary to share the HMD. As a result there is no guarantee that the current wearer of the HMD corresponds to the current logged in account holder.

The present invention seeks to address or mitigate this problem.

SUMMARY OF THE INVENTION

In a first aspect, a personalisation system configured to perform head mounted display personalisation is provided in accordance with claim 1.

In another aspect, a method of head mounted display personalisation is provided in accordance with claim 11.

Various other aspects and features of the present invention are defined in the appended claims and within the text of the accompanying description.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A system and method of head mounted display personalisation are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
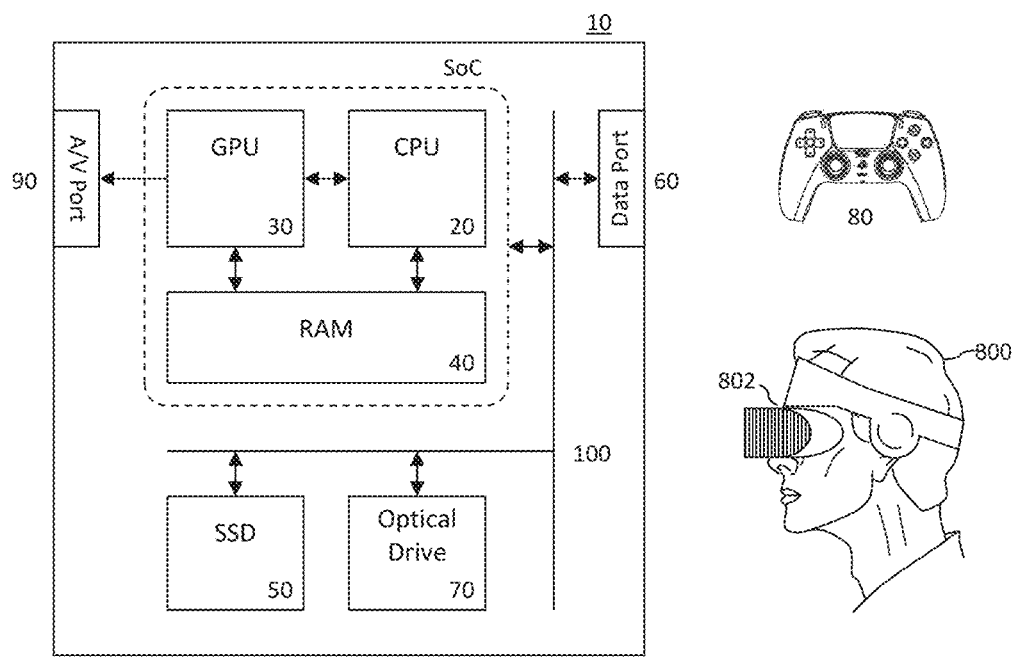
FIG. 1 is a schematic diagram of a system comprising an entertainment system and head mounted display, in accordance with embodiments of the present description.

Referring now to the drawings, wherein like reference numerals designate identical or corresponding parts throughout the several views, in FIG. 1 an example of a system of head mounted display personalisation is an entertainment system 10 such as a computer or console like as the Sony® PlayStation 5® (PS5), or equivalently a development kit for such a console.

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

It will be appreciated that a head mounted display 'HMD' 802, worn by a user 800, can display images output by the entertainment system.

Figure 2:
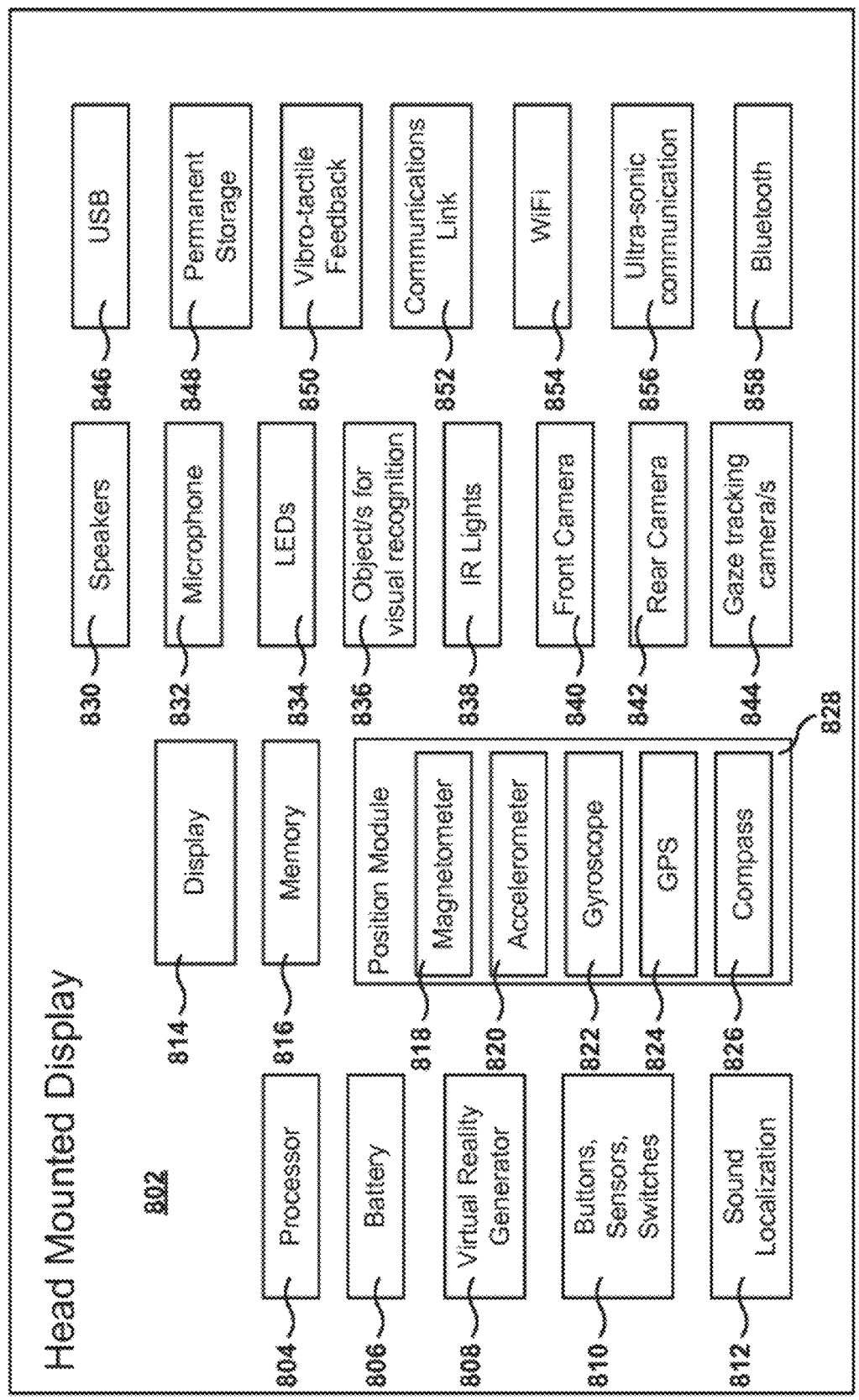
FIG. 2 is a block schematic diagram of functional components of a head mounted display, in accordance with embodiments of the present description.

Referring now to FIG. 2, this illustrates the architecture of an example HMD device. The HMD may also be a computing device and may include modules usually found on a computing device, such as one or more of a processor 804, memory 816 (RAM, ROM, etc.), one or more batteries 806 or other power sources, and permanent storage 848 (such as a solid state disk).

One or more communication modules can allow the HMD to exchange information with other portable devices, other computers (e.g. the PS5®), other HMDs, servers, etc. Communication modules can include a Universal Serial Bus (USB) connector 846, a communications link 852 (such as Ethernet®), ultrasonic or infrared communication 856, Bluetooth® 858, and WiFi® 854.

A user interface can include one or more modules for input and output. The input modules can include input buttons (e.g. a power button), sensors and switches 810, a microphone 832, a touch sensitive screen (not shown, that may be used to configure or initialize the HMD), one or more front cameras 840, one or more rear cameras 842, one or more gaze tracking cameras 844. Other input/output devices, such as a keyboard or a mouse, can also be connected to the portable device via communications link, such as USB or Bluetooth®.

The output modules can include the display 814 for rendering images in front of the user's eyes. Some embodiments may include one display, two displays (one for each eye), micro projectors, or other display technologies. Other output modules can include Light-Emitting Diodes (LED) 834 (which may also be used for visual tracking of the HMD), vibro-tactile feedback 850, speakers 830, and a sound localization module 812, which performs sound localization for sounds to be delivered to speakers or headphones. Other output devices, such as headphones, can also connect to the HMD via the communication modules, be permanently attached to the HMD, or integral to it.

One or more elements that may be included to facilitate motion tracking include LEDs 834, one or more objects for visual recognition 836, and infrared lights 838. Alternatively or in addition, the one or more front or rear cameras may facilitate motion tracking based on image motion.

Information from one or more different modules can be used by the position module 828 to calculate the position of the HMD. These modules can include a magnetometer 818, an accelerometer 820, a gyroscope 822, a Global Positioning System (GPS) module 824, and a compass 826. Alternatively or in addition, the position module can analyse image data captured with one or more of the cameras to calculate the position. Further yet, optionally the position module can perform tests to determine the position of the portable device or the position of other devices in the vicinity, such as a WiFi ping test or ultrasound tests.

A virtual reality generator 808 then outputs one or more images corresponding to a virtual or augmented reality environment or elements thereof, using the position calculated by the position module. The virtual reality generator 808 may cooperate with other computing devices (e.g., PS5® or other game console, Internet server, etc.) to generate images for the display module 814. The remote devices may send screen updates or instructions for creating game objects on the screen. Hence the virtual reality generator 808 may be responsible for none, some, or all of the generation of one or more images then presented to the user, and/or may be responsible for any shifting of some or all of one or both images in response to inter-frame motion of the user (e.g. so-called reprojection).

It should be appreciated that the embodiment illustrated in FIG. 2 is an exemplary implementation of an HMD, and other embodiments may utilize different modules, a subset of the modules, or assign related tasks to different modules. The embodiment illustrated in FIG. 2 should therefore not be interpreted to be exclusive or limiting, but rather exemplary or illustrative. It will also be appreciated that the functionality of at least a subset of the modules may be provided by, or in concert with, corresponding modules of the entertainment device (in turn typically provided by a processor of that device operating under suitable software instruction).

For an HMD with one or more cameras, a so-called inside out position and/or motion tracking technique can be used, where the HMD determines its motion from an analysis of images from the one or more cameras being used, optionally in conjunction with other sensors (e.g. gyroscopes and/or accelerometers).

One analysis technique for these images is simultaneous localization and mapping ('SLAM'). This technique enables the HMD (or the PS5, or a combination of the two working cooperatively) to build a map of the environment (or sample points thereof), and then determine a position within it.

Typically SLAM uses two or more cameras to enable depth detection (e.g. based on parallax/disparity between captured images) of feature points within the real world. A number of SLAM techniques are known, and any suitable technique may be considered, including PTAM, ORB-SLAM, DTAM, LSD-SLAM, DSO, and SVO.

SLAM uses the detected position of feature points or 'landmarks' to track movement of the cameras (and hence also the HMD) relative to the surrounding environment. There is scope for error, either due to cumulative errors in feature point estimation (for example due to shadows, image pixel pitch, or repeating patterns such as tiling), and so optionally the SLAM output can be cross-checked with gyroscopes and/or accelerometers in the HMD (or similarly with an external camera tracking the HMD), as so-called sensor fusion, to detect any inconsistency in the SLAM estimation and correct for it.

Advantageously, where the system is linked for example to a videogame console such as the PS5®, typically the user's environment is stable between sessions (i.e. the basic layout of the room stays the same in terms of its proportions, window and door placement, and typically also fittings and furnishings), meaning that the SLAM model can be retained between sessions, and optionally refined and updated during subsequent sessions.

A processor for SLAM position/motion tracking may be incorporated into the HMD (e.g. as processor 804, or as part of a position module 828), or may be provided by an associated computer, such as CPU 20 on the PS5®, or may be a combination of the two.

SLAM may be used to detect a unique characteristic of the current wearer and hence identify them, either positively (in terms of being a person for whom personalisation details are known) or negatively (in terms of not being a person for whom personalisation details are known). Appropriate responses for either case may then be enacted, as detailed elsewhere herein.

A particular feature that may be unique to users within a single household, or other small group of users who share an HMD, is their height.

SLAM may be used to gauge either the absolute or relative height of different users when they wear the HMD, and this height may then be correlated with different user personalisation profiles.

For example a user's height or average height may be determined from measurements taken when the HMD is static on the user's head (or only moving within a tolerance threshold), and is substantially horizontal. In this way, outlier values that could otherwise be obtained when the user jumps up and down or bends over are avoided. The measurements can be derived from feature points in the real world environment detected using SLAM.

Relative height between users may be determined by determining the relative positions of corresponding feature points within the SLAM model of the environment when the HMD is worn by different users.

Meanwhile absolute height may be determined for example using disparity measurements from two or more cameras of feature points on the floor of the real world environment, and/or by comparison to objects of known dimensions, such as a handheld controller associated with play with the HMD.

The identification by relative or absolute height may include a tolerance for example of ±1, 2 or 3 cm (or any internal equivalent, such as image pixels) to account for users wearing (or not wearing) different footwear during different play sessions.

In a typical family or other small group (such as in a house share), the detected difference in height between users may be sufficient to identify each group member.

It will be appreciated that in practice the user's height as used for identification purposes may be the height at which the HMD sits on their head, and more specifically the height of the one or more cameras on the HMD used for SLAM analysis when the user wears the HMD. References herein to the user's height or eye height may be used interchangeably with the height of the HMD or cameras thereon when the HMD is worn by that user.

One aspect of personalisation that may then be applied to use of the HMD is the user's effective eye height within the virtual environment; in a first person perspective game or other immersive experience, it can be disorientating or reduce immersiveness to be a noticeably different height within a virtual environment than when in the real world; normal activities, such as reaching for a door handle or climbing stairs, can feel very strange if one's in-game height is 5, 10 or 20 cm different to that in real life. This difference is particularly noticeable if the in-game height is shorter than the user's normal height.

In a case where the or each camera used for SLAM is mounted on the display and optics unit that presents images to the user's eyes, and consequently is substantially at eye height, the detected height of the cameras naturally acts as a good approximation for the height of the user's eyes. Optionally a predictable offset for example corresponding to change in height to the midline of the display and optics unit may be added to the effective eye height of the user to refine this approximation.

This approach may also be usable when users sit down for example on the same couch or chair; the difference in height between users may be small in this case, but still distinguishable. It will be appreciated that a same personalisation profile can be associated with both a standing height and a sitting height.

A refinement to the above technique is to determine a user's height or average height as a rolling average over multiple sessions; once a user has been positively identified as a particular user, the height measurement or average height measurement for that session can make a contribution to a rolling average for the user's height; this allows the system to track users who are still growing. This may be done periodically, for subject to a minimum intervening period of successive playing sessions, or a day, week, month, multiple months (e.g. quarterly), or year.

However, in cases where height is insufficient to distinguish between users, or where a further source of identification is preferable, or if height is not being used, then alternatively or in addition SLAM may be used to measure other characteristic features of the user when they come into view of the HMD cameras.

In particular characteristic features may include one or more of hand size, arm extension, at least a partial front and/or rear torso profile (depending on cameras used), and more generally at least partial body shape/proportion of the user wearing the HMD can be measured using SLAM to either positively identify the particular user, or to determine that they are not a currently known user. It will be appreciated that the user's body has a predictable relationship to their head, and so the user's body can be identified as such within captured images from the or each used camera for this purpose.

Characteristic features can also be dynamic; for example a characterising feature of a particular user may be the motion used to pick the HMD up from its storage place for placement on the user's head; this motion may be characteristic of the user's height and/or reach, alternatively or in addition characteristic of a pattern of behaviour of the user when placing the HMD on their head; for example they may hold the HMD upside down and rotatably lift it onto their head, or temporarily hold it vertically to inspect the lenses, or the like. This pattern of motion may be thought of as a signature or fingerprint of the user and may be detected using SLAM (and/or other motion detection within the HMD, such as accelerometers/gyroscopic sensors).

The or each characteristic feature used to identify a user may then be stored in association with a personalisation profile.

For previously unknown users (i.e. users whose height and/or other characteristic features indicate that they are someone for whom a personalisation profile does not yet exist), a personalisation profile may be created, optionally after asking the user to confirm that this is their first time using the HMD (if they indicate it is not, then optionally a list of previously known users may be provided, for the user to identify themselves).

Optionally a user can identify themselves as the user whose account is currently active (or where multiple accounts are active, for example due to two people playing together with one on an HMD and one on a TV, identify the relevant account) and the personalisation profile can also be associated with that account. This enables their personalisation setting to be chosen by default for example when they log in.

The personalisation profile may include a number of pieces of information relevant to use of an HMD, including one or more of the following:

The user's absolute height;
The user's height relative to another known user of the same HMD;
The user's interpupillary distance;
The user's range of motion (e.g. one or more of limb extension, limb range of motion, tendency to move position or stand/sit still, etc);
The user's viewing behaviour (e.g. typical angular ranges of change of viewpoint that the user performs primarily with a change of gaze, versus a change of head position; optionally as a map of positional changes within the displayed field of view that will trigger head motion);
Typical duration of play; and
Typical duration of play without a pause.

Several of these pieces of information may be determined during use of the HMD; for example when an unknown user first wears the HMD, this may trigger a calibration process to determine their interpupillary distance, for the purposes of adjusting the HMD and/or images displayed by it in response to this distance. When the user subsequently wears the device and is identified according to the techniques herein, these adjustments may then made automatically based on their personalisation profile, or where one or more of the adjustments require manual intervention by the user (for example to adjust display/lens spacing) they can be guided to the previously determined correct position.

Meanwhile features such as the user's range of motion may be used to assist with gesture recognition, or to alter hit boxes or other in game triggers to accommodate the user's reach or movement.

Similarly the user's viewing behaviour, and in particular what changes in focus of attention cause head movement as opposed to gaze change, can be used to reduce head motion, or limit it to a range that maintains comfort over a longer period of play.

Meanwhile the typical duration of play, and/or the typical duration of play without a pause may indicate the users rate of fatigue when wearing the HMD, which may be useful for example when recommending in game tasks that may take a certain amount of time to complete; if it can be anticipated that a user's typical gameplay is N minutes, then activities taking substantially or slightly less than this time may be recommended at the start of gameplay, but may not be recommended halfway through a play session; instead shorter activities may be recommended.

Meanwhile, where the personalisation profile is also associated with an account (or if the user if prompted to provide the information separately), the profile may also include or link to one or more of:

The user's age;
The user's gender;
The user's nationality and/or preferred language; and
The user's friend list.

This information may be used to select games or modify in-game content, generate suitable multiplayer matches, enable or disable certain functionality, set time limits for HMD use, trigger parental controls, and the like.

Notably, a personalisation profile may be associated with a user account that is not local to the current entertainment device; for example if a friend visits the owner of an entertainment device to play with their HMD, they may log in using their own user account; accordingly the personalisation profile may be created that is created may be stored on a central server, and optionally relayed back to the visiting friends own entertainment device. Similarly even if they do not log in (for example if the owner of the entertainment device is not in themselves, but passes the HMD to their friend), if the system detects that they are an unknown user they may be given the option to enter their user ID and hence associate the newly created personalisation profile with their user account in a similar manner.

It will be appreciated that when a user is sharing the HMD with other people in the same room, the personalisation system could use SLAM and/or audio data to determine who else is in the room and hence by elimination who may be currently wearing the HMD (or vice versa); hence for example a microphone may identify or characterise the voice of a first person in the room other than the current wearer; subsequently after the HMD has been swapped over so that the first person is now wearing it, a microphone on the HMD or handheld controller now being used by the first person may be used to identify the first person as the wearer of the HMD based on their voice. Their voice or a representation thereof (for example a formant model) can be included in their personalisation profile.

It will also be appreciated that SLAM can be used to at least partially model the body shape and all proportions of a person in the room whilst they are not using the HMD, and then when they are subsequently recognised as using it (for example based upon audio information, or matching the partial model to a partial SLAM model of the current wearer) then the partial model, or a combination of partial models generated when the user was not and now is the wearer, may be included in the personalisation profile.

It will also be appreciated that SLAM models of known users (i.e. users with personalisation profiles) can be compared with at least partial models of other people in the room to determine whether they are known users currently not wearing the HMD. Hence for example if three siblings all have personalisation profiles, and two can be recognised in the room based on their voice and/or a SLAM model of their body shape, then by elimination the third sibling is likely to be wearing the HMD even if this cannot be otherwise verified using any of the techniques herein, and personalisation adjustments can be made or advised accordingly.

Other variant approaches may similarly be considered, such as for example analysing the images captured for SLAM analysis for other analysis, such as facial recognition; again users in the room other than the wearer may then be eliminated from consideration as the identity of the current wearer, or conversely may be recognised as the current wearer for example by recognising their face from a gaze tracking camera as they put the HMD on their head. Again an image of a user's face or a representation thereof (such as a so-called eigenface) may be included in the personalisation profile.

As noted elsewhere herein, such a personalisation profile may be associated with data that serves to identify the user such as their voice or a SLAM model of their body shape or characteristic movements, and additionally where a user ID is known, the personalisation profile may be associated with this user ID.

In a summary embodiment of the present description, a personalisation system is configured to perform head mounted display personalisation, and comprises the following.

Firstly, a head mounted display 'HMD' 802 comprising at least a first video camera (840, 842), as described elsewhere herein.

Secondly, a simultaneous localization and mapping processor (for example processor 804 of the HMD 802, processor 20 of the entertainment device 10, or any suitable combination of the two) configured (for example by suitable software instruction) to detect feature points of a real world environment captured by the at least first video camera when the HMD is worn by a user, as described elsewhere herein.

Thirdly, a user identification processor (for example processor 804 of the HMD, processor 20 of the entertainment device, or any suitable combination of the two) configured (for example by suitable software instruction) to identify the user responsive to at least a subset of the detected feature points of the real world environment, as described elsewhere herein.

Fourthly, a personalisation processor (for example processor 804 of the HMD, processor 20 of the entertainment device, or any suitable combination of the two) configured (for example by suitable software instruction) to personalise at least a first aspect of presenting graphical content to the user with the HMD in response to identification of the user, as described elsewhere herein.

And fifthly, a storage processor (for example processor 804 of the HMD, processor 20 of the entertainment device, or any suitable combination of the two) configured (for example by suitable software instruction) to store, in a memory (for example memory 816 or permanent storage 848 of an HMD, or ram 40 or SSD 50 of the entertainment device), personalisation information in association with the identification of the user for subsequent use, as described elsewhere herein.

It will be apparent to a person skilled in the art that variations in the above system corresponding to operation of the various embodiments of the method and/or systems as described and claimed herein are considered within the scope of the present disclosure, including but not limited to that:

- the user identification processor determines a height of the at least first video camera responsive to at least a subset of the detected feature points in the real world environment, the height of the or each camera on the HMD being indicative of the user who is wearing it, as described elsewhere herein;
    - in this case, optionally the determined height is treated as indicative of a user if it is within a predetermined tolerance of a previously recorded height for that user, as described elsewhere herein;
    - similarly in this case, optionally the determined height is periodically combined with one or more previously recorded height for that user in a rolling average of the user's height, then used to subsequently indicate the user, as described elsewhere herein;
    - similarly in this case, optionally two separate heights are treated as indicative of the same user, the first height corresponding to the user standing and the second height corresponding to the user sitting, as described elsewhere herein.
- the user identification processor determines one or more characteristic features of the user responsive to at least a subset of the detected feature points in the real world environment, the one or more characteristic features being indicative of the user, as described elsewhere herein;
    - in this case, optionally the one or more characteristic features of the user comprise one or more selected from the list consisting of a hand size, an arm extension, at least a partial front torso profile, at least a partial rear torso profile, at least a partial body shape, and at least a partial body proportion, as described elsewhere herein;
- the personalisation information stored in association with the identification of the user comprises one or more selected from the list consisting of the user's height, the user's interpupillary distance, the user's range of motion, the user's viewing behaviour, the user's typical duration of play, and the user's typical duration of play without pause, as described elsewhere herein.

It will also be appreciated that a system comprising the entertainment system 10 or equivalent and the above personalisation system may act cooperatively to present graphical content to the user with the HMD, and optionally that the entertainment system comprises one or more of the simultaneous localisation mapping processor, the user identification processor, the personalisation processor, storage processor, and the memory, of the personalisation system, as described elsewhere herein, or contributes to the functionality of such processes in conjunction with a corresponding processor of the HMD or a third party device, such as a supplementary processor box located between the HMD and the entertainment system.

Figure 3:
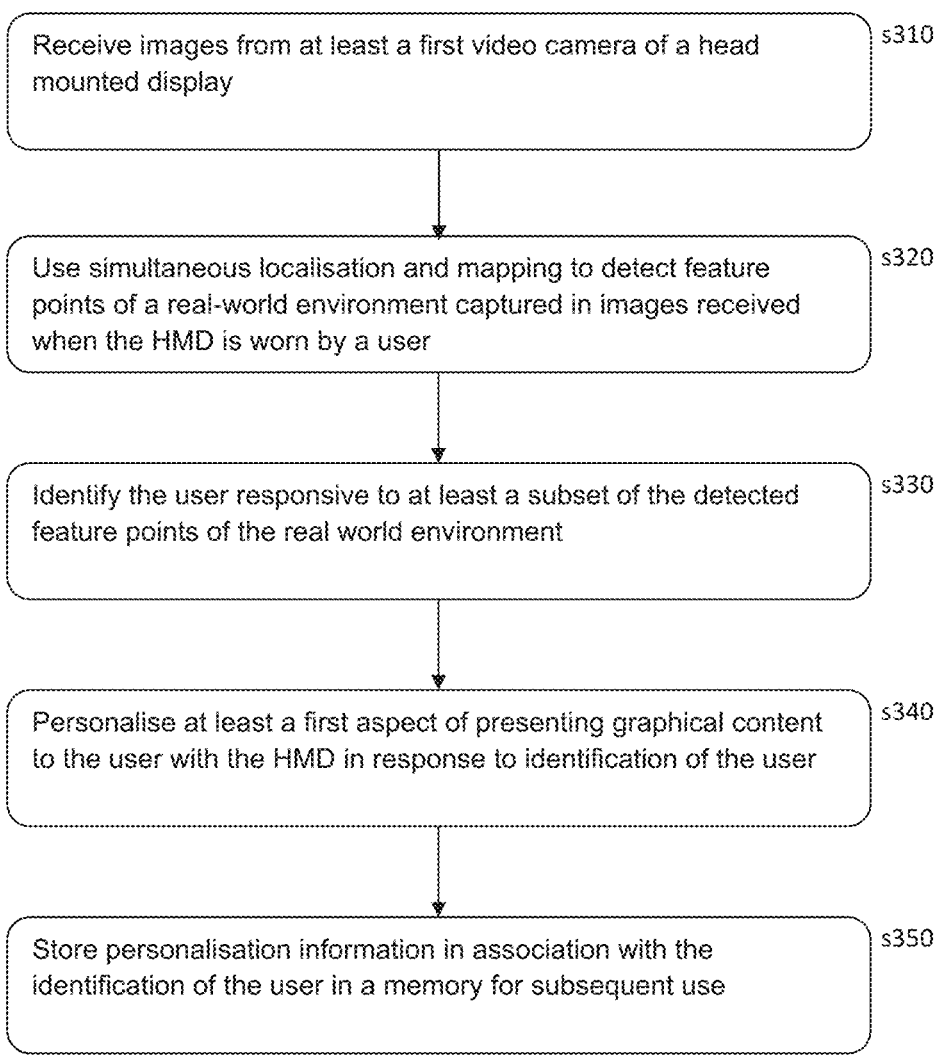
FIG. 3 is a flow diagram of a method of head mounted display personalisation, in accordance with embodiments of the present description.

Turning now to FIG. 3, in a corresponding summary embodiment of the present description, a method of head mounted display personalisation comprises the following steps.

A first step s310 comprises receiving images from at least a first video camera of a head mounted display, as described previously herein.

A second step s320 comprises using simultaneous localisation and mapping (for example by a processor of one or more of the HMD and entertainment system, operating under suitable software instruction) to detect feature points of a real-world environment captured in images received when the HMD is worn by a user, as described previously herein.

A third step s330 comprises identifying (for example by a processor of one or more of the HMD and entertainment system, operating under suitable software instruction) the user responsive to at least a subset of the detected feature points of the real world environment, as described previously herein.

A fourth step s340 comprises personalising (for example by a processor of one or more of the HMD and entertainment system, operating under suitable software instruction) at least a first aspect of presenting graphical content to the user with the HMD in response to identification of the user, as described previously herein.

A fifth step s350 comprises storing (for example by a processor of one or more of the HMD and entertainment system, operating under suitable software instruction) personalisation information in association with the identification of the user in a memory (for example a memory or permanent storage of one or more of the HMD and entertainment system) for subsequent use, as described previously herein.

It will be apparent to a person skilled in the art that variations in the above method corresponding to operation of the various embodiments of the method and/or systems as described and claimed herein are considered within the scope of the present disclosure, including but not limited to that:

- the step of identifying the user comprises determining a height of the at least first video camera responsive to at least a subset of the detected feature points in the real world environment, the height of the or each camera on the HMD being indicative of the user who is wearing it, as described previously herein;
- the step of identifying the user comprises determining one or more characteristic features of the user responsive to at least a subset of the detected feature points in the real world environment, the one or more characteristic features being indicative of the user, as described previously herein; and
    - in this case, optionally the one or more characteristic features comprise one or more selected from the list consisting of a hand size, an arm extension, at least a partial front torso profile, at least a partial rear torso profile, at least a partial body shape, and at least a partial body proportion of the user, as described previously herein.

It will be appreciated that the above described methods and techniques may be carried out on conventional hardware suitably adapted as applicable by software instruction or by the inclusion or substitution of dedicated hardware, as described elsewhere herein.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A personalisation system configured to perform head mounted display personalisation comprises:
   a head mounted display 'HMD' comprising at least a first video camera;
   a simultaneous localization and mapping processor configured to detect feature points of a real world environment captured by the at least first video camera when the HMD is worn by a user;
   a user identification processor configured to identify the user responsive to at least a subset of the detected feature points of the real world environment;
   a personalisation processor configured to personalise at least a first aspect of presenting graphical content to the user with the HMD in response to identification of the user; and
   a storage processor operable to store, in a memory, personalisation information in association with the identification of the user for subsequent use.

2. A personalisation system according to claim 1, in which the user identification processor determines a height of the at least first video camera responsive to at least a subset of the detected feature points in the real world environment, the height of the or each camera on the HMD being indicative of the user who is wearing it.

3. A personalisation system according to claim 2, in which the determined height is treated as indicative of a user if it is within a predetermined tolerance of a previously recorded height for that user.

4. A personalisation system according to claim 2, in which the determined height is periodically combined with one or more previously recorded height for that user in a rolling average of the user's height, then used to subsequently indicate the user.

5. A personalisation system according to claim 2, in which two separate heights are treated as indicative of the same user, the first height corresponding to the user standing and the second height corresponding to the user sitting.

6. A personalisation system according to claim 1, in which the user identification processor determines one or more characteristic features of the user responsive to at least a subset of the detected feature points in the real world environment, the one or more characteristic features being indicative of the user.

7. A personalisation system according to claim 6, in which the one or more characteristic features comprise one or more of:
   i. a hand size;
   ii. an arm extension;
   iii. at least a partial front torso profile;
   iv. at least a partial rear torso profile;
   v. at least a partial body shape; and
   vi. at least a partial body proportion
   of the user.

8. A personalisation system according to claim 1, in which the personalisation information stored in association with the identification of the user comprises one or more of:
   i. the user's height;
   ii. the user's interpupillary distance;
   iii. the user's range of motion;
   iv. the user's viewing behaviour;
   v. the user's typical duration of play; and
   vi. the user's typical duration of play without pause.

9. A system comprising
   an entertainment system; and
   a personalisation system configured to perform head mounted display personalisation, including:
   a head mounted display 'HMD' comprising at least a first video camera;
   a simultaneous localization and mapping processor configured to detect feature points of a real world environment captured by the at least first video camera when the HMD is worn by a user;
   a user identification processor configured to identify the user responsive to at least a subset of the detected feature points of the real world environment;
   a personalisation processor configured to personalise at least a first aspect of presenting graphical content to the user with the HMD in response to identification of the user; and
   a storage processor operable to store, in a memory, personalisation information in association with the identification of the user for subsequent use.

10. The system of claim 9, in which the entertainment system comprises one or more of the simultaneous localisation mapping processor, the user identification processor, the personalisation processor, storage processor, and the memory, of the personalisation system.

11. A method of head mounted display personalisation comprises the steps of:
    receiving images from at least a first video camera of a head mounted display 'HMD';
    using simultaneous localisation and mapping to detect feature points of a real-world environment captured in images received when the HMD is worn by a user;
    identifying the user responsive to at least a subset of the detected feature points of the real world environment;
    personalising at least a first aspect of presenting graphical content to the user with the HMD in response to identification of the user; and
    storing personalisation information in association with the identification of the user in a memory for subsequent use.

12. A method according to claim 11, in which the step of identifying the user comprises: determining a height of the at least first video camera responsive to at least a subset of the detected feature points in the real world environment, the height of the or each camera on the HMD being indicative of the user who is wearing it.

13. A method according to claim 11, in which the step of identifying the user comprises: determining one or more characteristic features of the user responsive to at least a subset of the detected feature points in the real world environment, the one or more characteristic features being indicative of the user.

14. A method according to claim 13, in which the one or more characteristic features comprise one or more of:
 i. a hand size;
 ii. an arm extension;
 iii. at least a partial front torso profile;
 iv. at least a partial rear torso profile;
 v. at least a partial body shape; and
 vi. at least a partial body proportion
of the user.

15. A non-transitory, computer readable storage medium containing a computer program comprising computer executable instructions, which when executed by a computer system, cause the computer system to perform a method of head mounted display personalisation, by carrying out actions comprising the steps of:
 receiving images from at least a first video camera of a head mounted display 'HMD';
 using simultaneous localisation and mapping to detect feature points of a real-world environment captured in images received when the HMD is worn by a user;
 identifying the user responsive to at least a subset of the detected feature points of the real world environment;
 personalising at least a first aspect of presenting graphical content to the user with the HMD in response to identification of the user; and
 storing personalisation information in association with the identification of the user in a memory for subsequent use.

* * * * *